(12) United States Patent
Talapatra et al.

(10) Patent No.: US 8,207,658 B2
(45) Date of Patent: Jun. 26, 2012

(54) CARBON NANOTUBE GROWTH ON METALLIC SUBSTRATE USING VAPOR PHASE CATALYST DELIVERY

(75) Inventors: Saikat Talapatra, Troy, NY (US); Swastik Kar, Troy, NY (US); Sunil Pal, Troy, NY (US); Robert Vajtai, Troy, NY (US); Pulickel Ajayan, Clifton Park, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 706 days.

(21) Appl. No.: 11/509,810

(22) Filed: Aug. 25, 2006

(65) Prior Publication Data

US 2012/0128880 A1 May 24, 2012

(51) Int. Cl.
*D01F 9/12* (2006.01)

(52) U.S. Cl. .................... 313/341; 423/447.3; 361/502; 977/843

(58) Field of Classification Search ............... 423/447.3; 313/341; 361/502; 977/843
See application file for complete search history.

(56) References Cited

U.S. PATENT DOCUMENTS

| | | | |
|---|---|---|---|
| 6,495,258 B1 | 12/2002 | Chen et al. | |
| 6,808,746 B1 * | 10/2004 | Dai et al. | 427/249.1 |
| 7,160,531 B1 * | 1/2007 | Jacques et al. | 423/447.3 |
| 7,465,494 B2 * | 12/2008 | Ren et al. | 428/367 |
| 2005/0238810 A1 | 10/2005 | Scaringe et al. | |
| 2005/0287064 A1 | 12/2005 | Mayne et al. | |

FOREIGN PATENT DOCUMENTS

JP 2004-284921 A 10/2004

OTHER PUBLICATIONS

Agrawal et al., "Directed Growth and Electrical-Transport Properties of Carbon Nanotube Architectures on Indium Tin Oxide Films on Silicon-Based Substrates," Adv. Funct. Mater., 2005, 15:1922-1926.
Zhu et al., "Well-Aligned and Open-Ended Carbon Nanotube Architectures: An Approach for Device Assembly," Nano Letters, 2006, 6(2):243-247.

* cited by examiner

*Primary Examiner* — Stuart Hendrickson
(74) *Attorney, Agent, or Firm* — Foley & Lardner LLP

(57) ABSTRACT

A chemical vapor deposition (CVD) method using a vapor phase catalyst of directly growing aligned carbon nanotubes on a metal surfaces. The method allows for fabrication of carbon nanotube containing structures that exhibit a robust carbon nanotube metal junction without a pre-growth application of solid catalytic materials to the metal surface or the use of solder or adhesives in a multi-step fabrication process.

9 Claims, 12 Drawing Sheets

Figures 2A-E
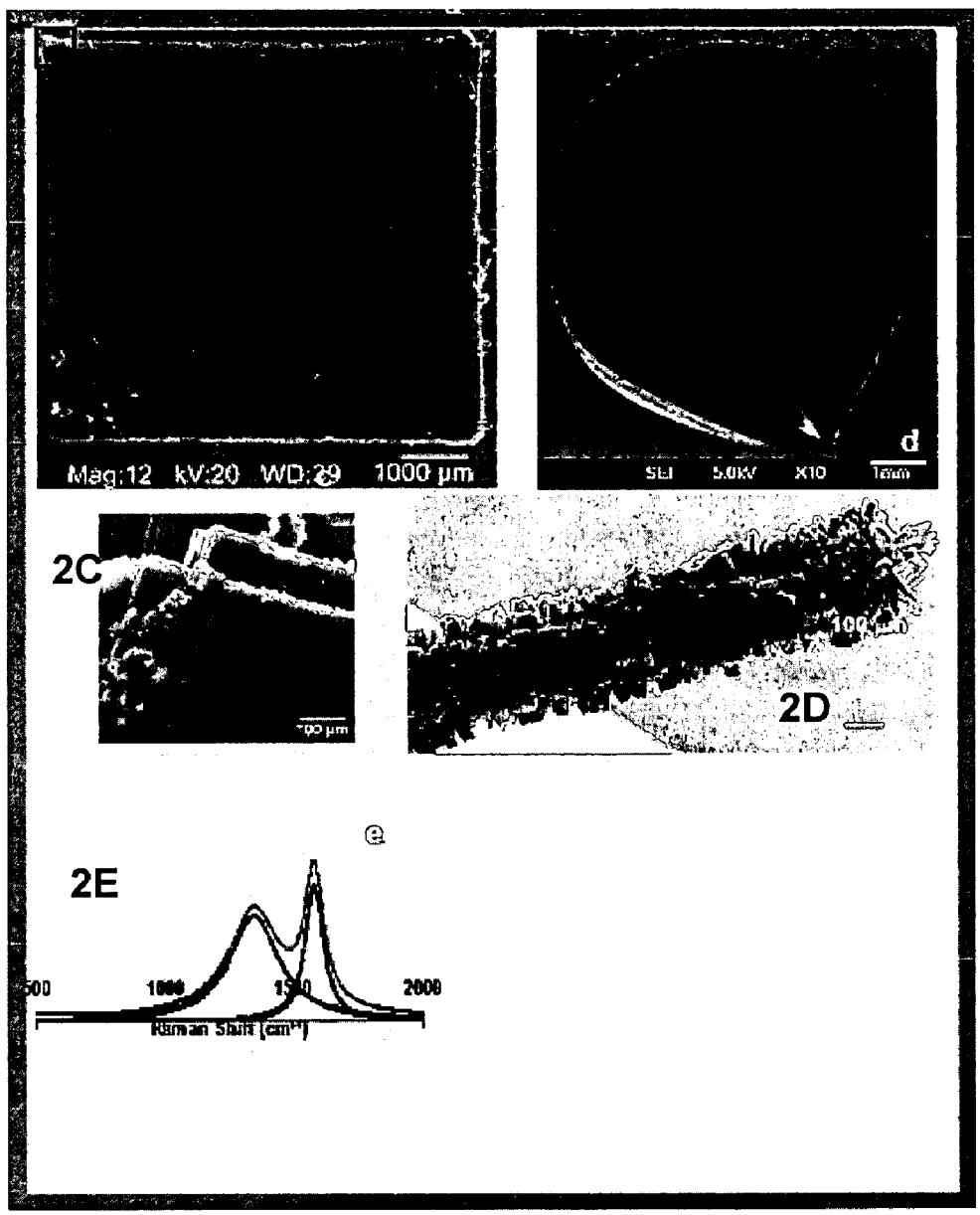

US 8,207,658 B2

CARBON NANOTUBE GROWTH ON METALLIC SUBSTRATE USING VAPOR PHASE CATALYST DELIVERY

STATEMENT OF GOVERNMENT INTEREST

The present invention was made with financial support at least in part by the National Science Foundation, under grant number DMR-0117792. The U.S. Government has certain rights in this invention.

BACKGROUND OF THE INVENTION

The present invention relates generally to carbon nanotubes and more particularly to direct growth of carbon nanotubes on a metal surface.

Carbon nanotubes have captured the attention of materials scientists and technologists due to their unique one-dimensional structure by virtue of which they acquire superior electrical, mechanical and chemical properties. For example, due to their high current carrying capacity (about $10^{10}$ Amp/$cm^2$) they are envisioned as key interconnect components of future nanoelectronic devices. Though vertically aligned carbon nanotube growth on $SiO_2$ substrates and their surface selective growth mechanism has been reported extensively in recent years, carbon nanotubes could not be directly grown on metallic substrates from the vapor phase without providing catalyst islands on the substrate. This posses a major limitation on various nanotube based applications, such as for example, use as active elements in field emission displays, sensors and other electronic devices.

Articles describe aligned nanotube growth on porous Indium Tin Oxide (ITO) coated silicon (Si) substrate (where the growth is on Si and not on ITO) and the multi-step post-production process of using carbon nanotube transfer technology enabled by open-ended carbon nanotube mats on solder material. See S. Agrawal, et al., Adv. Funct. Mat. 15, 1922 (2005) and L. Zu, et al., Nano Lett., 6, 243 (2006). These methods result in carbon nanotubes grown on silicon or ITO, or in carbon nanotubes that are indirectly attached to a substrate with a solder adhesive. However these are complicated and multi-step processes and nanotubes grown on indium tin oxide (ITO) substrates have disadvantages due to the brittle and fragile nature of ITO. To break this substrate limitation for nanotube growth, it is important to either develop new processes which will render direct growth of aligned carbon nanotubes on metals or identify suitable metals/metal alloys on which nanotubes can be grown easily with the available technologies at hand.

SUMMARY OF THE INVENTION

An embodiment of the invention provides a structure, comprising a substrate having a metal surface, and a plurality of carbon nanotubes directly grown on the metal surface of the substrate, wherein the plurality of carbon nanotubes are substantially aligned in a direction perpendicular to the surface of the substrate, and pre-deposited catalyst islands are substantially absent at a base or a tip of said plurality of carbon nanotubes.

Another embodiment of the invention provides a method for making carbon nanotubes, comprising providing a substrate having a metal surface, providing a vapor phase mixture comprised of a nanotube forming precursor and a nanotube growth catalyst onto the metal surface of the substrate, and directly growing the carbon nanotubes on the metal surface of the substrate such that the carbon nanotubes are substantially aligned in a direction perpendicular to said metal surface of the substrate

BRIEF DESCRIPTION OF THE DRAWINGS

FIGS. 2A-D and 2G-2I are scanning electron microscopy images of carbon nanotube structures according to preferred embodiments of the present invention.

FIG. 2E is a plot of the results of Raman spectroscopy investigation on the nanotube structures according to preferred embodiments of the present invention shown in FIG. 2A.

DETAILED DESCRIPTION OF THE PREFERRED EMBODIMENTS

Figure 1:
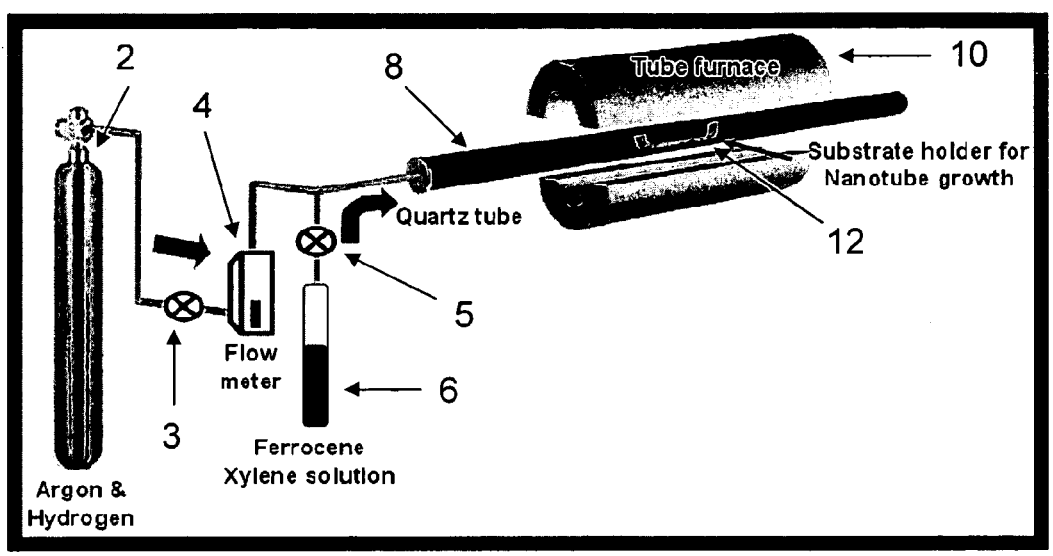
FIG. 1 is a three dimensional schematic depicting a chemical vapor deposition (CVD) apparatus used for the direct growth of carbon nanotubes according to the preferred embodiments of the present invention.

The present inventors have developed a method of directly growing aligned carbon nanotubes on a metal surface.

Directly grown carbon nanotubes are carbon nanotubes that are grown on a substrate rather than soldered or otherwise attached to a substrate after growth. This direct carbon nanotube growth is accomplished without pre-deposited nanotube growth catalyst islands, adhesives or solder applied to the metal surface prior to initiation of nanotube growth. Thus, pre-deposited nanotube growth catalyst islands, solder or adhesives are absent from the carbon nanotube containing structures fabricated by the method. A substantial absence of pre-deposited catalyst islands in carbon nanotube containing structures means that pre-deposited catalytic islands are not present in the carbon nanotube containing structures except for catalyst material incorporated into the carbon nanotubes from the vapor phase during growth. No solid catalytic islands exist on the surface of the substrate before CVD growth and catalyst islands are absent from the tips of most carbon nanotubes.

One preferred embodiment of the invention provides a structure, comprising a substrate with a metal surface and a plurality of carbon nanotubes directly grown on the metal surface of the substrate. The plurality of carbon nanotubes are substantially aligned in a direction perpendicular to the surface of the substrate and pre-deposited catalyst islands, adhesive, and solder are substantially absent from the base or tip of the plurality of carbon nanotubes.

Another preferred embodiment of the invention provides a method of making carbon nanotubes, comprising providing a substrate having a metal surface and providing a nanotube source gas onto the metal surface of the substrate. The nanotube source gas preferably comprises a mixture of nanotube forming precursor gas, such as xylenes, and a growth catalyst, such as ferrocene. However, other suitable gases or a single source gas may be used instead. For example, other aromatic carbon source gases, such as n-hexane, alcohols, etc. and metal catalyst gases, such as nickelocene or cobaltocene may be used.

The method further provides for directly growing the carbon nanotubes on the metal surface of the substrate. The directly grown carbon nanotubes are substantially aligned in a direction perpendicular to the metal surface of the substrate. The metal surface is preferably a nonmagnetic metal alloy, such as INCONEL 600. However, other suitable magnetic or nonmagnetic metal or metal alloy surfaces may be used instead, such as other INCONEL alloys, including the INCONEL 718 and 750 alloys. Other alloys including comprising Al, Cu, Co, Cr, Fe, Ni, Pt, Ta, Ti or Zn alloys may also be used if they support direct nanotube growth.

Without wishing to be bound by a particular theory, it is believed that for growing vertically aligned carbon nanotubes on smooth substrates, formation of a high density catalyst particle from the vapor phase on the surface is needed. This is believed to be possible if there is minimal surface diffusion of the catalyst particle. It is believed that there is minimal or no surface diffusion of the iron catalyst particles from the ferrocene catalyst gas when INCONEL is used as the substrate. Thus, other low surface diffusion metals may also be used as a substrate surface. The metal surface is preferably inert to carbon nanotube growth and is not a nanotube growth catalyst. Instead, the nanotube growth catalyst is provided from the vapor phase.

The entire substrate may be comprised of the metal that comprises the metal surface on which the carbon nanotubes are directly grown. Alternatively, the substrate may be comprised of one or more materials other than the metal that comprises the metal surface on which the carbon nanotubes are directly grown as long as at least some portion of a surface of the substrate has been coated with said suitable metal. The one or more materials coated with the suitable metal may be, but do not have to be, unable to support direct carbon nanotube growth with a vapor phase catalyst. Examples of such substrate materials include gold, copper, and silicon, but other materials may also be used. Thus, the substrate may comprise a bulk portion which is unable to support direct carbon nanotube growth coated with a layer or thin film of suitable metal.

The embodiments of the present invention exhibit several advantages over previously existing methods of carbon nanotube growth. First, the method of the embodiments of the present invention is a single step resulting in a plurality of directly grown, substantially aligned nanotubes on a metal surface of a substrate. Second, this plurality of directly grown, substantially aligned nanotubes is uniform over a large area, such as a more than one millimeter square metal substrate. Third, the plurality of directly grown, substantially aligned nanotubes can be grown to a desired thicknesses (i.e., heights) ranging from 1 μm to 500 μm. Fourth, the plurality of directly grown, substantially aligned nanotubes can be grown on metal substrates of varying geometrical shapes.

In a preferred aspect of the present invention, the metal surface of a substrate comprises INCONEL 600. The reported composition of INCONEL 600 is 72% nickel (Ni), 16% chromium (Cr) and 8% iron (Fe). Other suitable metals may be used instead, such as other INCONEL alloys or other Ni—Cr—Fe alloys. The use of a suitable metal surface makes inclusion of a solid nanotube growth catalyst material on the metal surface, such as a metal nanoparticle layer, unnecessary. Thus, such a layer is substantially absent from the preferred embodiments of the present invention. The substantial absence of such a layer results in a more robust connection between the metal surface and the directly grown carbon nanotubes. Due to the strength of the nanotube-metal surface connection, the carbon nanotube structures can be handled with ease. Further, the nanotube-INCONEL 600 junction shows Ohmic behavior over a wide range of temperatures (25 K-300 K).

In preferred embodiments of the present invention, substantially aligned carbon nanotubes are directly grown on a metal surface in a single step process. This process is preferably carried out through a CVD method that delivers a nanotube source gas comprising a mixture of nanotube-forming precursor and nanotube growth catalyst (in compound or elemental form) from the gas phase.

The CVD method for direct growth of carbon nanotubes without predeposition of metal catalysts on the metal surface will now be described. Nanotube growth is performed by exposing a metal surface comprising INCONEL 600 to vapor mixtures comprising xylenes ($C_8H_{10}$), a nanotube forming precursor, and ferrocene ($Fe(C_5H_5)_2$), a nanotube catalyst, at about 600 to 1100° C., preferably at about 700 to 800° C. Ferrocene preferably comprises 0.001 to 1% of the ferrocene/xylenes mixture. However, other suitable sources gases and temperatures may be used instead. 0.2 mm thick sheets of INCONEL 600 were used as the metal growth surface in the examples illustrated in FIGS. 2A-D. Ferrocene was dissolved in xylenes (which preferably contains different isomers) at concentrations of about 0.01 g/ml, the mixture was preheated, co-evaporated and fed into the CVD chamber with a carrier gas mixture comprised of argon (Ar) (85%) and hydrogen ($H_2$) (15%). The gas flow rate of the carrier gas/nanotube source gas mixture was 100 standard cubic centimeter per minute (s.c.c.m.). Prolonged growth at a temperature of 770° C. produced films of densely packed multiwalled carbon nanotubes on the INCONEL, 600 surfaces. Aligned nanotubes readily grew on the INCONEL 600 surfaces in a direction normal to the growth surface. Uniform, vertically aligned nanotube films having a height ranging from 1 μm to 400 μm can be obtained easily using these substrates.

FIG. 1 is a schematic depicting the CVD apparatus used for the direct growth of carbon nanotubes according to the preferred embodiments of the present invention. The flow rate of the carrier gas mixture from the carrier gas tank or tanks 2 was regulated with a valve 3 and measured with a flow meter 4. From the flow meter 4, the carrier gas mixture was directed over the ferrocene and xylene solution in vessel 6 and into a quartz tube 8. The opening of the ferrocene and xylene containing vessel 6 is regulated by another valve 5. The quartz tube 8 passes through a tube furnace 10. The substrate holder 12 for nanotube growth is found within the quartz tube 8 at some point within the tube furnace 10. Other suitable CVD apparatus may also be used.

FIGS. 2A-D show examples of aligned nanotubes grown directly on INCONEL 600 surfaces. However, the present invention should not be considered limited by the structures and methods of the specific examples, which are merely provided for illustration of the present invention. FIG. 2A illustrates an SEM image of a top-down view of vertically aligned arrays of directly grown nanotubes on a 4 mm×4 mm (0.2 mm thick) INCONEL 600 sheet.

FIG. 2B illustrates an SEM image of directly grown nanotubes aligned normal to the growth surface on a bent piece of INCONEL 600. The dimensions of the INCONEL 600 sheet are similar to those of the sheet in FIG. 2A.

FIG. 2C illustrates an SEM image of the substantially aligned, directly grown nanotubes on the top left corner of the INCONEL 600 substrate shown in FIG. 2A. Nanotubes grow normal to the substrate metal surface. Thus the nanotubes are substantially aligned perpendicular to the metal surface of the substrate from which they grow such that they are oriented in the substantially the same direction.

FIG. 2D illustrates an SEM image of directly grown nanotubes on a piece of 0.05 mm diameter as received INCONEL 600 wire. Thus, as shown in FIGS. 2A-2D, the metal growth surface may be flat or curved.

Figure 2F:
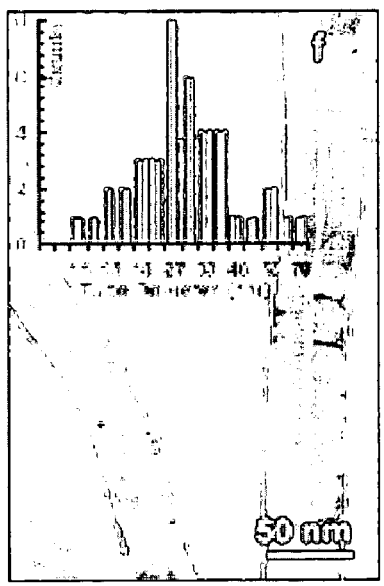
FIG. 2F is a TEM image of typical nanotubes grown by the CVD process of the embodiments of the invention. The diameter distribution of the nanotubes determined from TEM imaging is shown in the inset.

FIG. 2F is a TEM image of typical nanotubes grown by the CVD process of the embodiments of the invention. The diameter distribution of the nanotubes determined from TEM imaging is shown in the inset. The diameter of the multi-walled nanotubes ranges from about 10 to about 70 nm with an average diameter of about 30 nm.

FIG. 2E is a plot of the results of Raman spectroscopy investigation on the nanotube structures shown in FIG. 2A. The spectrum obtained by this investigation shows the G band (~1580 cm$^{-1}$) and D band (~1345 cm$^{-1}$) peaks typical of nanotubes.

An additional embodiment of the present invention provides a coating of INCONEL 600 on any other material, conductive or otherwise (for example gold, beryllium, copper, silicon, etc.), which is not otherwise suitable for nanotube growth, for use as the substrate. The use of such a substrate in the method of this preferred embodiment results in substantially aligned, directly grown nanotubes on the INCONEL 600 surface, regardless of the material located beneath the INCONEL coating.

Figure 2G:
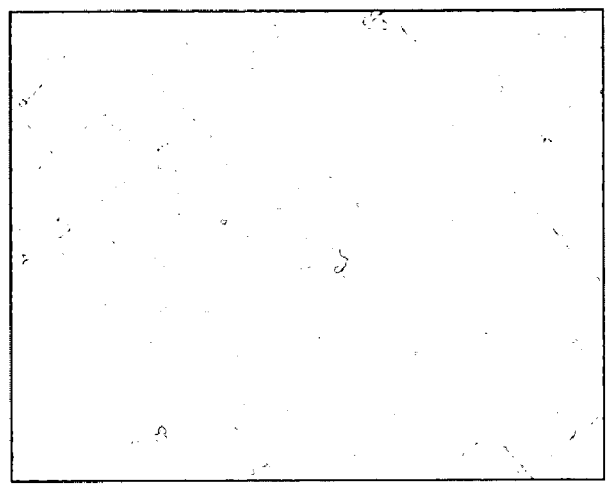
Figure 2H:
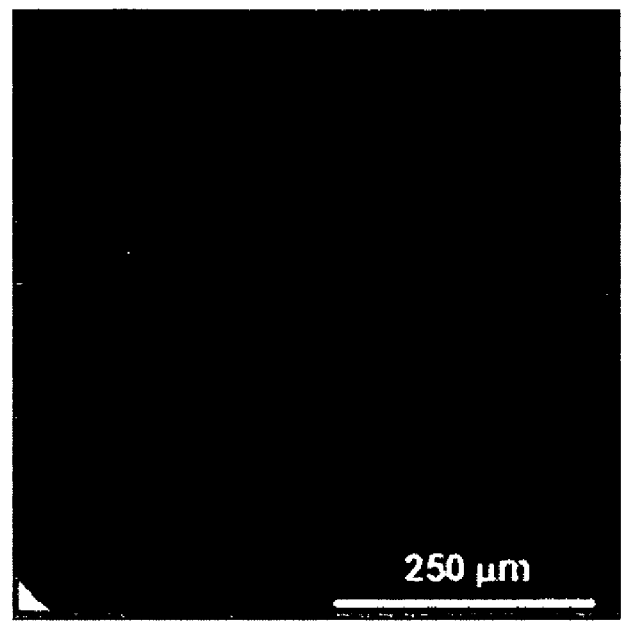
Figure 2I:

FIGS. 2G-2I illustrate SEM images of examples of this additional preferred embodiment. A thin layer of INCONEL 600 was thermally evaporated on gold coated silicon masked with a TEM grid and on beryllium copper alloy wires. The substantially aligned carbon nanotubes were then grown on the INCONEL 600 coated substrates. FIGS. 2G and 2H illustrate the results of nanotube growth on INCONEL 600 patterns formed on gold. The grid shaped gold regions exposed between the INCONEL patterns (i.e., the portions of the gold that were masked by TEM grid during INCONEL deposition) did not show nanotube growth. FIG. 2I illustrates the results of the growth on INCONEL 600 coated beryllium copper alloy wire.

For integration of carbon nanotubes grown on conductive substrates into technological applications, which include, but are not limited to thermal management, microelectronics and through-wafer vertical interconnect assemblies, it is of utmost importance that the nanotube-substrate interface is mechanically strong and electrically transparent. For example, electrically end contacted, dense bundles of nanotubes can be used as materials which electrically contact different metal levels and/or portions of metal layers in electronic device metallization, such as short or local interconnects and via fill (i.e., plug) structures for giga-scale integration for sub-50 nm semiconductor device structures. The nanotubes described above are contacted on their ends, not on their sides, by the metal substrate surface, which can function as an electrode or interconnect.

Figure 3:
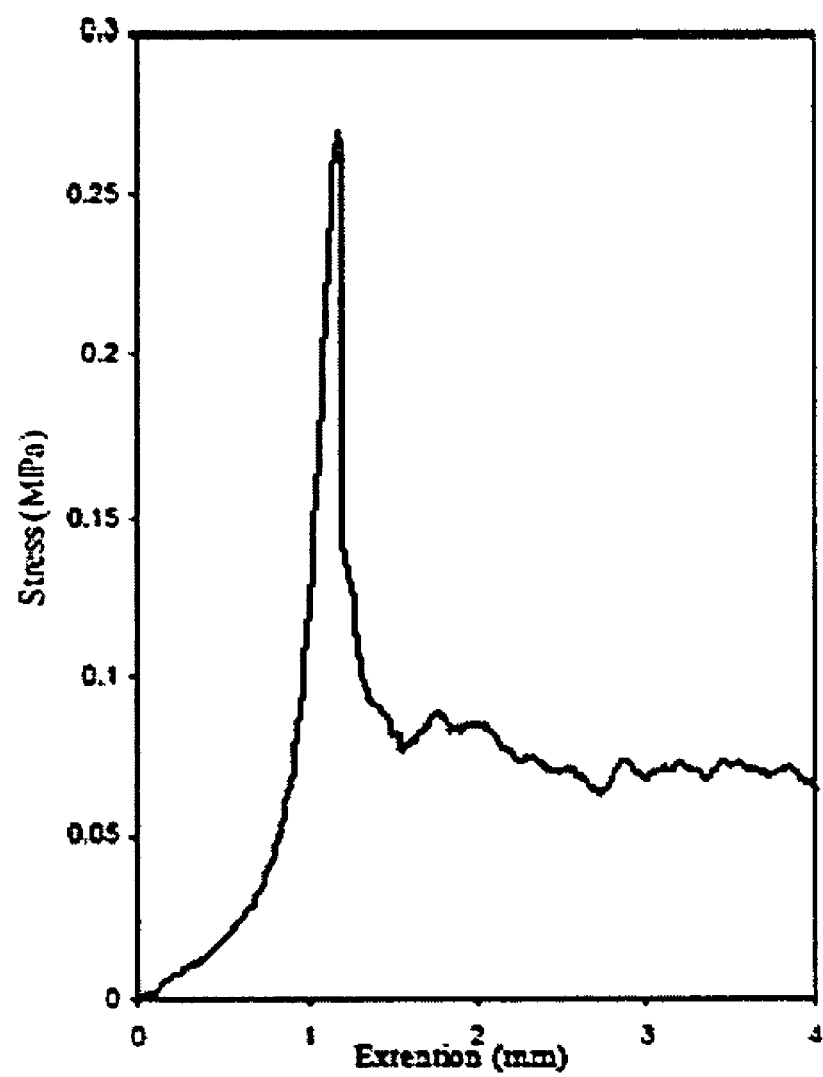
FIG. 3 is a plot of the measurement of the adhesion strength between directly grown, substantially aligned nanotubes and a metal surface according to preferred embodiments of the present invention.

FIG. 3 illustrates a plot of the results of mechanical characterization of the interface between directly grown, substantially aligned nanotubes and an INCONEL 600 substrate. Shear testing was conducted on these nanotube structures to determine the adhesion strength. The adhesion strength was measured in an Instron 5803 electromechanical tester. A portion of the INCONEL wire with the directly grown, substantially aligned nanotubes attached was wrapped with adhesive tape (Scotch). During the testing, the Scotch tape adhered to the nanotubes and was moved away at a constant speed of 1 mm min$^{-1}$ until the nanotubes detached from the wire. The contact area used for determining the stress required to detach the nanotubes was the geometrical area of the cylindrical surface of the INCONEL wire covered with the tape. The shear adhesion strength of the substantially aligned nanotubes directly grown on INCONEL wires was found to be about 0.26 MPa. Thus, the adhesion strength between the metal substrate and the nanotubes is at least 0.26 MPa.

Electrical characterization (measurement of current versus voltage behavior) of the nanotube metal junction has been conducted on substantially aligned nanotubes directly grown on an INCONEL 600 substrate. The electrical characterization was conducted at various temperatures. One of the important features of the INCONEL 600 nanotube junction was that the current versus voltage behavior was found to be Ohmic over a wide temperature range (25 K-300 K).

Figure 4:
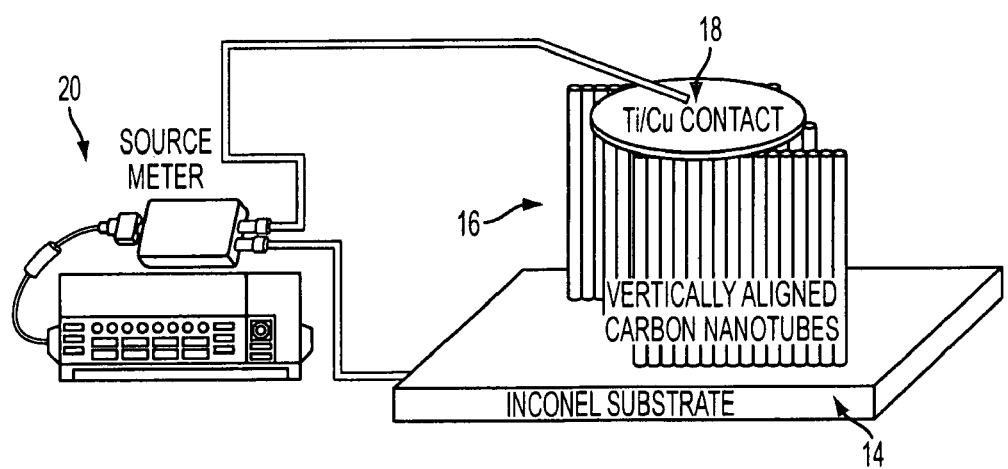
FIG. 4 is a three dimensional schematic depicting the measurement apparatus used to collect the current-voltage (I-V) characteristics of vertical nanotube bundles according to preferred embodiments of the present invention.

FIG. 4 shows the schematic of the setup used for measuring the current versus voltage behavior. A source meter 20 was connected to the INCONEL 600 substrate 14 directly and to a large pattern (about 3 mm) of the substantially aligned, directly grown nanotubes 16 through a titanium (Ti)/copper (Cu) contact 18.

Figure 5A:
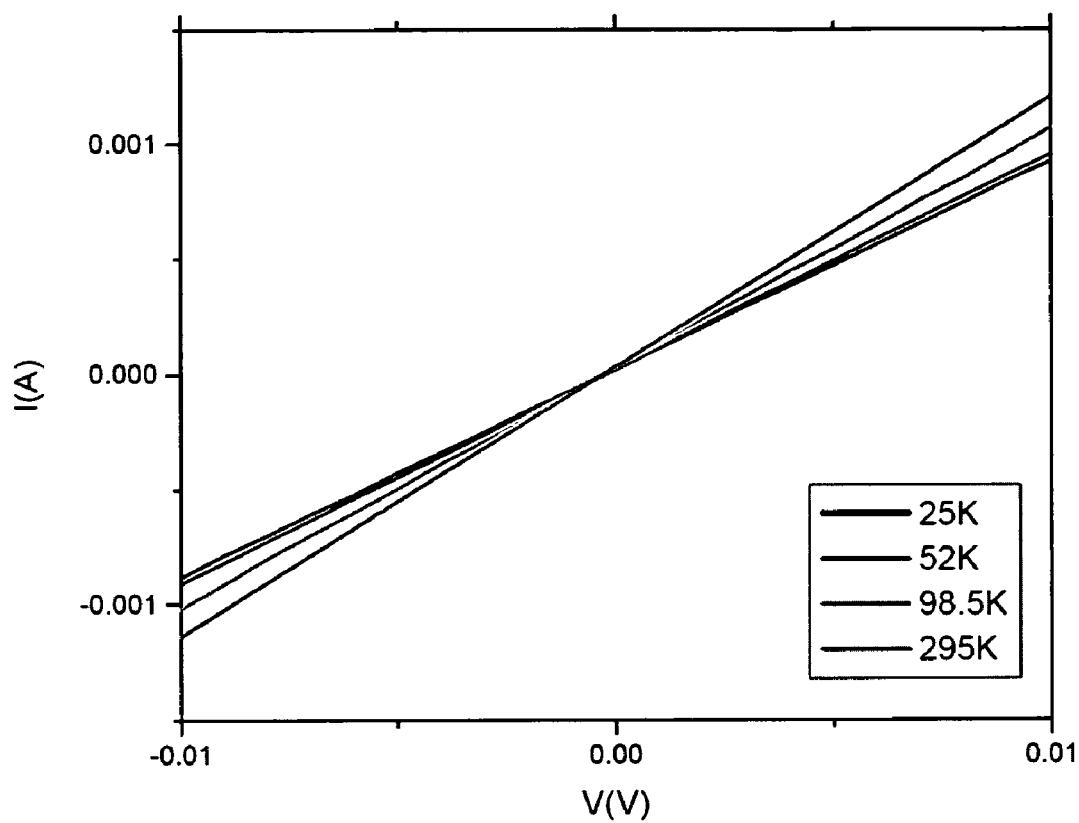
FIG. 5A is a plot of the I-V characteristics at different temperatures (for V<10 mV) of carbon nanotube structures according to preferred embodiments of the present invention.

FIG. 5A is a plot of the I-V characteristics obtained under vacuum (5×10$^{-6}$ torr) from electrical characterization measurements taken with the setup shown in FIG. 4. The I-V characteristics (for V<10 mV) were measured at different temperatures (25K, 52K, 98.5K, and 295K). At each temperature measured, the I-V characteristics were linear with a slight increase in non-linearity at the lowest temperatures.

Figure 5B:
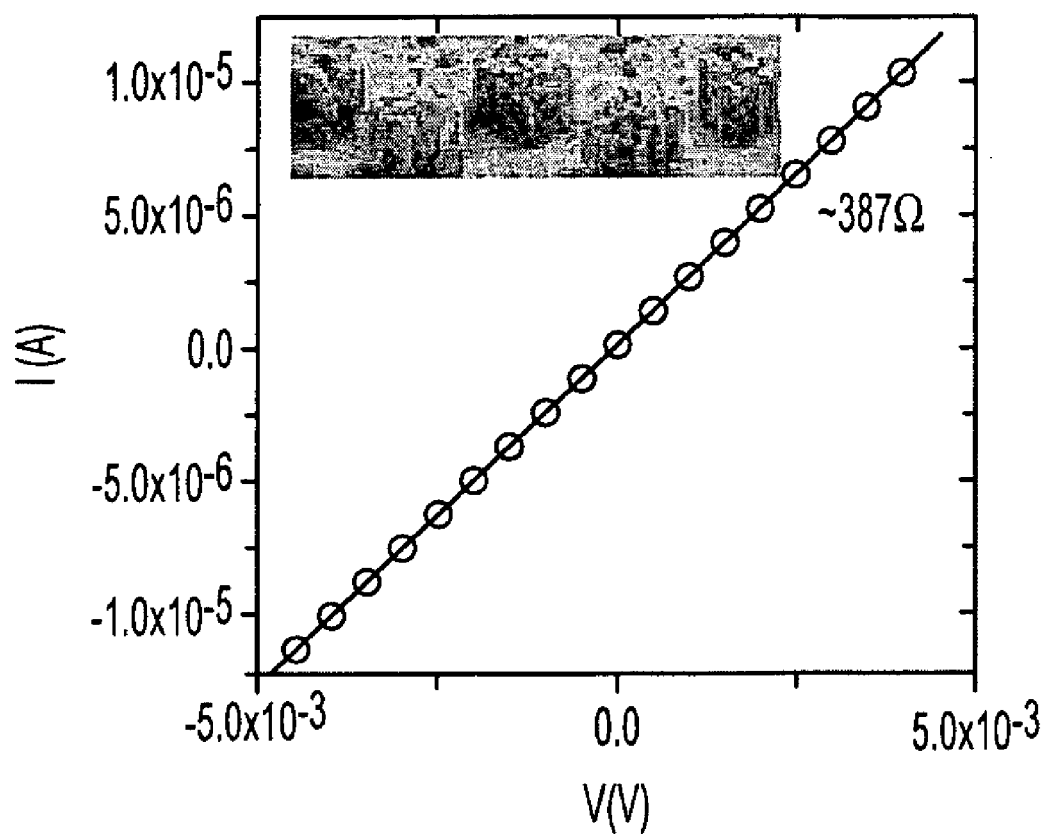
FIG. 5B is plot of the I-V characteristics of carbon nanotube structures (shown in the SEM image inset in this Figure) according to preferred embodiments of the present invention.

The resistance of directly grown, substantially aligned nanotube pillar structures on INCONEL 600 substrate shown in the inset in FIG. 5B was also measured using a micromanipulator probe top contact (tip size about 10 μm). The average total resistance (including the contact resistance and the fact that the probe did not touch more than 2% of the nanotubes) was found to be about 5 ohm over many samples (having a 70×70 micron pattern size and 50 micron height), suggesting good electrical contact between the nanotubes and the metal substrate. As shown in FIG. 5B, the resistance determined from the slope of the I-V plot was 387Ω. Thus, nanotube structures with resistance of 500 ohms or less for an area of 70 microns square are provided.

The above described nanotube structures having a good electrical contact between the nanotubes and the metal surface of the substrate can be used in double layer capacitors (also called "supercapacitors"). A typical double layer capacitor comprises two electrodes separated by a separator soaked in an electrolyte solution.

Figure 6:
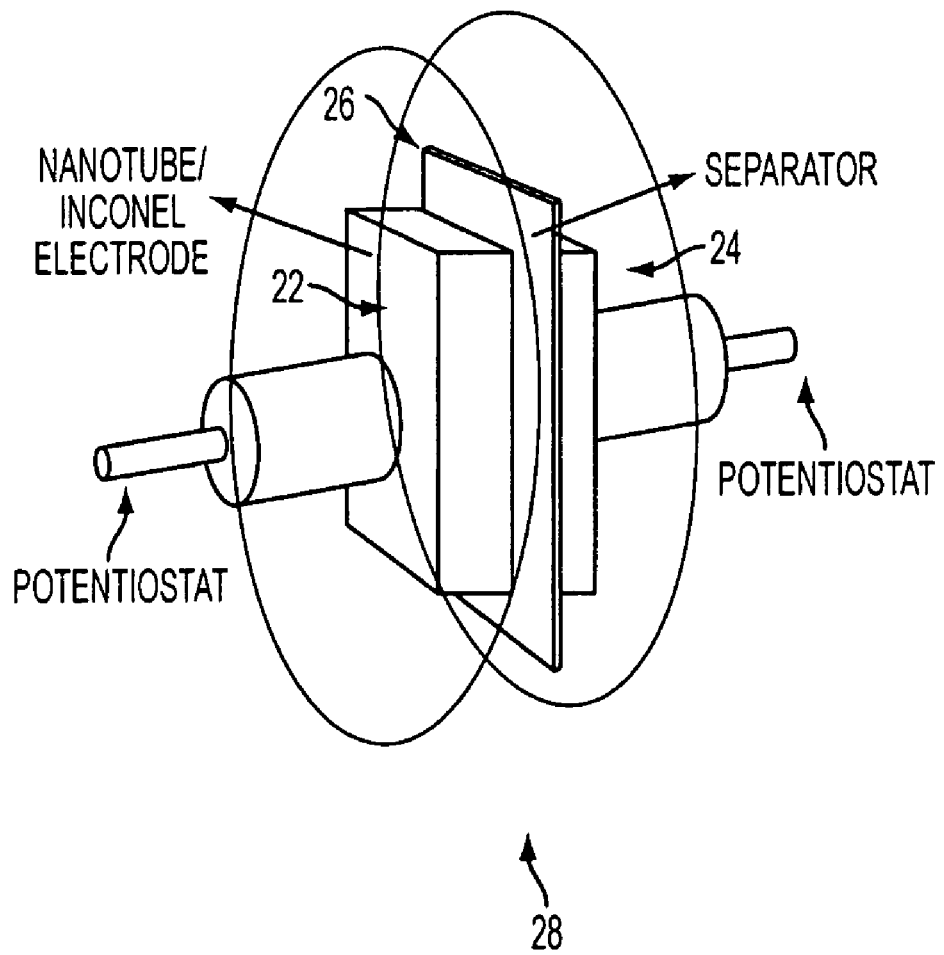
FIG. 6 is a three dimensional, schematic depicting the measurement apparatus used to collect the characteristics of the capacitive behavior of a double layer capacitor fabricated using directly grown, vertically aligned nanotube structures according to preferred embodiments of the present invention.

The capacitive behavior of a double layer capacitor fabricated using two nanotube structures as electrodes was measured. Both nanotube structures used for this measurement had INCONEL 600 as the substrate. FIG. 6 shows the schematic of the setup used for measuring the electrochemical and capacitance properties of these electrodes in a two-electrode system using 6 M potassium hydroxide (KOH) solution as the electrolyte. The electrodes 22 and 24 were sandwiched in a Swagelok type stainless steel test cell with a Whatman filter paper immersed in the electrolyte as the separator 26. Cyclic voltammetry and galvanostatic charge-discharge measurements were carried out using a Potentiostat/Galvanostat (EG&G Princeton Applied Research, Model 273A) 28.

Figure 7A:
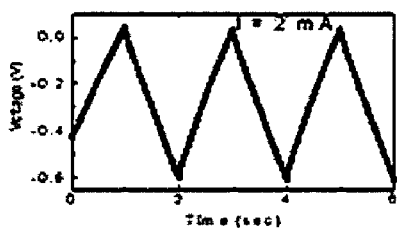
FIG. 7A is a plot of the galvanostatic charge-discharge behavior of the double layer capacitors fabricated using directly grown, vertically aligned nanotube structures according to preferred embodiments of the present invention.

FIG. 7A illustrates a plot of the galvanostatic charge-discharge behavior of the double layer capacitors acquired with an applied constant current of 2 mA in a time interval of 1 sec. The specific capacitance was evaluated from the slope of the charge-discharge curves, according to the following equation:

$$C_{sp} = \frac{I}{m(dv/dt)}$$

where I is the applied current and m is the mass of each electrode. The specific capacitance value calculated from the discharge slope was found to be 18 F/g with a power density of about 7 kW/kg at a 1000 mV/s scan rate. The high value of the power density is well suited for surge-power delivery applications. Thus, a double layer capacitor having a specific capacitance of at least 18 F/g and a power density of at least 7 kW/kg at a 1000 mV/s scan rate can be formed with the nanotube structures.

Figure 7B:
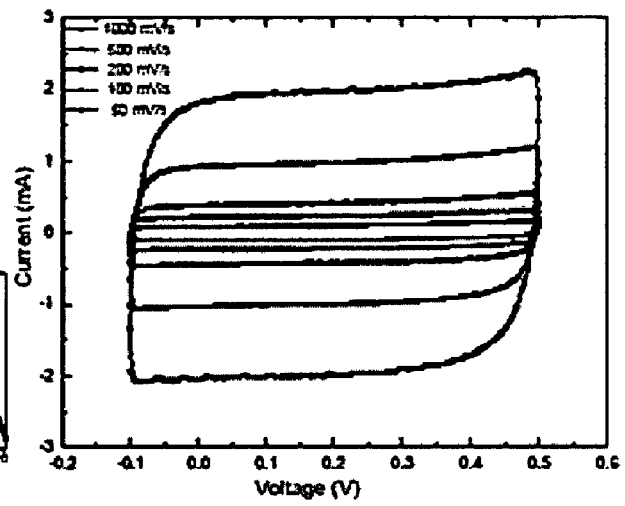
FIG. 7B illustrates plots of the cyclic voltammograms (CV) of the double layer capacitors fabricated using directly grown, vertically aligned nanotube structures according to preferred embodiments of the present invention.

FIG. 7B illustrates plots of the cyclic voltammograms (CV) of the double layer capacitors at various scan rates (50, 100, 200, 500 and 1,000 mV/s). The rectangular and symmetric shape of the CV performed at very high scan rates of 1000 mV/s manifests low contact resistance between the nanotubes and the INCONEL surface. Lowering the contact resistance between nanotubes and collector electrodes in double layer capacitors has been a major issue for developing carbon nanotube based super capacitors and is typically achieved by mixing nanotubes with conductive binders and coating collector electrodes with this composite. This process drastically modifies nanotube electrode properties, leading to adverse performance of the double layer capacitor. However, in the nanotube on INCONEL electrode containing capacitors, since the nanotubes are directly grown on the electrodes, the aforesaid difficulty does not arise.

The directly grown, substantially aligned nanotube structures of the present invention can be used in robust field emission devices. A typical field emission device is comprised of an electron emitting material, such as carbon nanotubes, that emits electrons when a potential is applied to the material. In optical display type of field emission devices, an electron sensitive phosphor is located across a gap from the electron emitting material. The electron emitting material may be arranged in a selectively activatable pixel array. The phosphor emits radiation, such as visible light, UV or IR radiation in areas being impacted by the emitted electrons from activated pixels. A voltage source is used to generate the electron emission from selected pixels by applying voltage to the selected pixels of the array.

For the field emission measurements, a metal anode with an adjustable separation distance was positioned parallel to the top surface of the substantially aligned nanotubes directly grown on an INCONEL 600 substrate. The spacing between the metal anode and the nanotubes was adjusted to about 30 μm. The field emission measurements were performed under a vacuum of about $2.2 \times 10^{-6}$ Torr by applying a voltage from 0-210 V between the nanotubes on the INCONEL 600 substrate and the metal anode and measuring the resulting current.

Figures 8A, 8B:
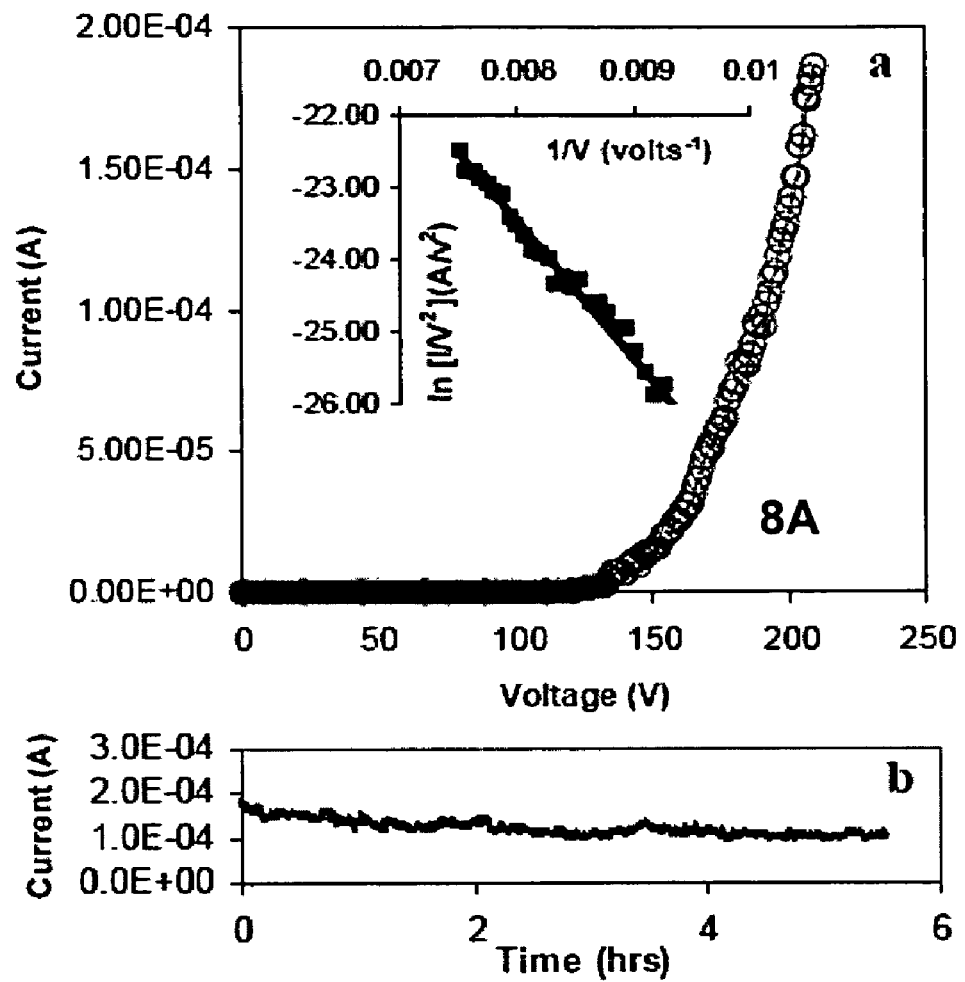
FIG. 8A is a plot of field emission current versus voltage for a field emission device comprised of carbon nanotube structures according to the preferred embodiments of the present invention. The inset in FIG. 8A is a F-N plot (ln $[I/V^2](A/v^2)$ versus 1/V) used to determine the field enhancement factor, β, of the field emission device comprised of carbon nanotube structures according to the preferred embodiments of the present invention.
FIG. 8B is a plot of field emission current at an applied voltage of 210 V versus time for the field emission device comprised of carbon nanotube structures according to the preferred embodiments of the present invention.

FIG. 8A illustrates plots of data collected during the use of directly grown, aligned nanotubes grown on an INCONEL 600 substrate as a field emission device. FIG. 8A is a plot of field emission current versus voltage. The emitted current follows a very well-known behavior, called the Fowler-Nordheim mechanism. The inset in FIG. 8A is the F-H plot used to determine the field enhancement factor, β3, which was found to be about 2500. A very low turn on field (about 3 V/μm) for this field emission device was also observed.

FIG. 8B is a plot of the field emission current at an applied voltage of 210 V (at a fixed field of 7 volts per micron) versus time. A stable current for over five hours of operation was observed. This demonstration of long term stable field emission current suggests that field emission devices constructed from the directly grown, aligned nanotube structures of the present invention may be suitable for long term operation.

Figure 8C:
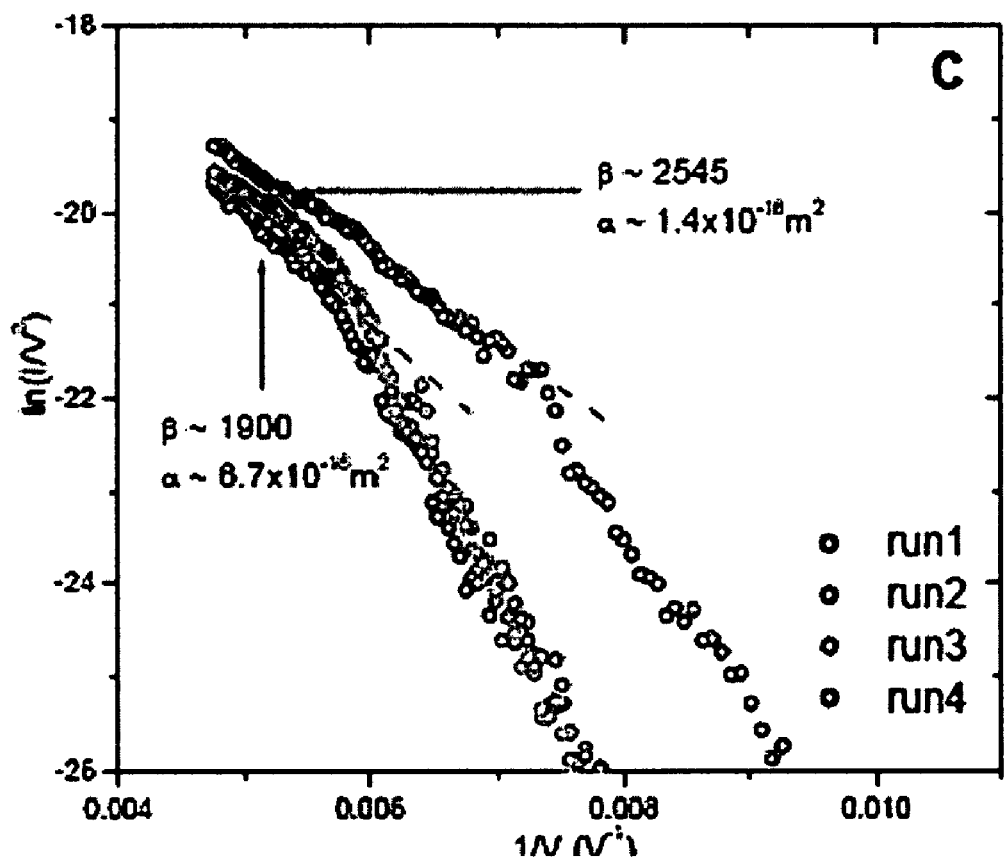
FIG. 8C shows Fowler-Nordheim plots of nanotube field emission devices according to the preferred embodiments of the present invention.

FIG. 8C shows additional Fowler-Nordheim plots for four test runs on the nanotube structures. Run number 4 was performed after the reliability test illustrated in FIG. 8B. The curves show at least two distinct slopes, attributed to a non-metal-like emission process from discrete energy states often seen in nanotubes. This is usually associated with the release of photons with a blackbody spectrum. The β values of about 1900 and about 2545 for runs 1-3 and run 4 were estimated for high field operation conditions from the FN plot. The effective area of emission α, decreases from about $6.7 \times 10^{-16}$ m$^2$ to $1.4 \times 10^{-16}$ m$^2$ after the reliability test, indicating that the emission is occurring from a single nanotube whose tip becomes sharper during the few hours of emission. The turn-on field also decreases from 3.91 V/μm to 3.22 V/μm when the current exceeded 10 nA. Thus, even as the nanotube emission parameters change over time, the electrical contact between the metal substrate surface and the nanotubes remains stable. The nanotube structures on the metal surface provide a field emission device with a turn on voltage of 3.91 V/μm or less, such as at least 3.22 V/μm, and a field enhancement factor of at least 1900, such as 2500 or greater.

Further, this demonstration of the immediate and direct application of the directly grown, aligned nanotube structures as field emission devices suggests that such devices may be constructed without any post production treatment or additional complicated fabrication process.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A method for making carbon nanotubes, comprising:
providing a substrate having a metal surface;
providing a vapor phase mixture comprised of a nanotube forming precursor and a nanotube growth catalyst onto the metal surface of the substrate; and
directly growing the carbon nanotubes on the metal surface of the substrate such that the carbon nanotubes are substantially aligned in a direction perpendicular to said metal surface of the substrate;
wherein:
said nanotube growth catalyst is a metal catalyst vapor, and said metal surface of the substrate comprises a nickel, chromium and iron alloy;
the carbon nanotubes comprise multiwalled carbon nanotubes;
the multiwalled carbon nanotubes are grown at a temperature of 600-1100° C.; and
the metal surface of the substrate is not coated with a nanotube growth catalyst prior to initiating nanotube growth.

2. The method of claim 1, wherein the nanotube forming precursor comprises xylene.

3. The method of claim 1, wherein the nanotube growth catalyst comprises ferrocene.

4. The method of claim 1, wherein the vapor phase mixture comprises a mixture of xylene and ferrocene.

5. The method of claim 1, wherein the nickel, chromium and iron alloy comprises about 72% nickel.

6. The method of claim 1, further comprising incorporating the carbon nanotubes directly grown on the metal surface into a field emission device comprising an electron emitting material, wherein the electron emitting material comprises the carbon nanotubes directly grown on the metal surface.

7. The method of claim 1, further comprising incorporating the carbon nanotubes directly grown on the metal surface into a double layer capacitor comprising two electrodes separated by a separator, wherein at least one electrode comprises the carbon nanotubes directly grown on the metal surface.

8. A method of growing carbon nanotubes on a metal surface of a substrate, the method comprising:
exposing the metal surface to a vapor phase mixture comprising a nanotube-forming precursor and a nanotube-growth catalyst; and
directly growing the carbon nanotubes on the metal surface such that the carbon nanotubes are substantially aligned in a direction perpendicular to the metal surface;
wherein the nanotube-growth catalyst is a metal catalyst vapor; and
wherein the metal surface of the substrate comprises a nickel, chromium and iron alloy.

9. The method of claim 8, wherein the nickel, chromium and iron alloy comprises about 72% nickel.

\* \* \* \* \*